United States Patent [19]

Van Dyke, Jr. et al.

[11] 4,043,687
[45] Aug. 23, 1977

[54] LATCHED TELESCOPING MEMBERS

[75] Inventors: William A. Van Dyke, Jr., Satellite Beach, Fla.; Frank S. Baker, Londonderry, N.H.; Robert McClintock, Framingham, Mass.

[73] Assignee: The United States of America as represented by the Secretary of the Army, Washington, D.C.

[21] Appl. No.: 676,072

[22] Filed: Apr. 12, 1976
(Under 37 CFR 1.47)

[51] Int. Cl.² .............................................. F16B 7/10
[52] U.S. Cl. ..................................... 403/109; 403/322
[58] Field of Search ................ 403/322, 328, 378, 33, 403/109, 110, 108; 285/317; 52/118, 121

[56] References Cited

U.S. PATENT DOCUMENTS

| 2,061,448 | 11/1936 | Bath et al. ........................ 403/322 X |
| 3,312,487 | 4/1967 | McIntyre ......................... 285/317 X |
| 3,685,865 | 8/1972 | Young ............................. 403/328 X |

Primary Examiner—Wayne L. Shedd
Attorney, Agent, or Firm—Nathan Edelberg; Robert P. Gibson; Herbert H. Murray

[57] ABSTRACT

This invention relates to a retractable locking pin for securing sections of a telescoping mast when in extended position. The pin is mounted on the outer section and fits into a cylindrical recess in the inner section to give good azimuth registration between the two sections.

1 Claim, 2 Drawing Figures

LATCHED TELESCOPING MEMBERS

BACKGROUND OF THE INVENTION

The device of the present invention is adapted for use with a vehicle mounted radar detection unit. The antenna for the radar is mounted on the top of a telescoping mast so that it can be raised for operation of the radar and lowered for transport from one position to another. Normal manufacturing techniques for telescoping masts permit azimuth tolerance buildup between telescoping sections resulting in azimuth errors in the radar signal detected. The use of close tolerance pins and close tolerance holes as provided by the present invention minimizes the azimuth errors.

In accordance with the need it is an object of this invention to provide a vertical lock for each telescoping section of a mast which also maintains close azimuth registration between sections of the mast.

DETAILED DESCRIPTION OF THE INVENTION

Figure 1:
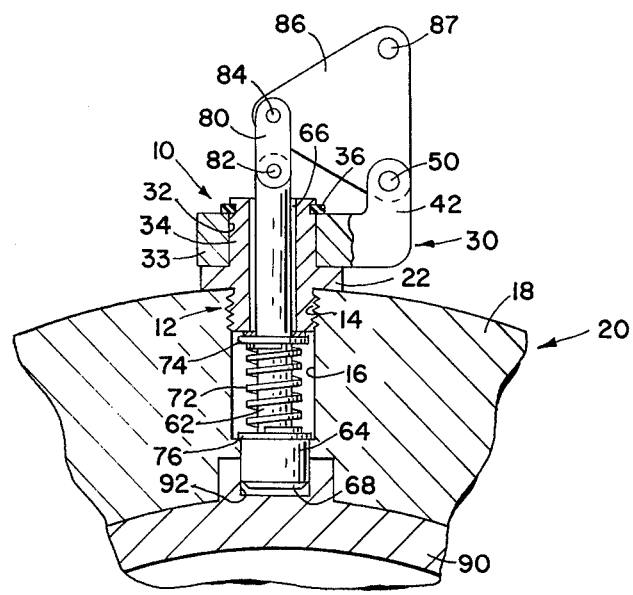
FIG. 1 is a horizontal section through a mast illustrating the pin of the present invention.
Figure 2:
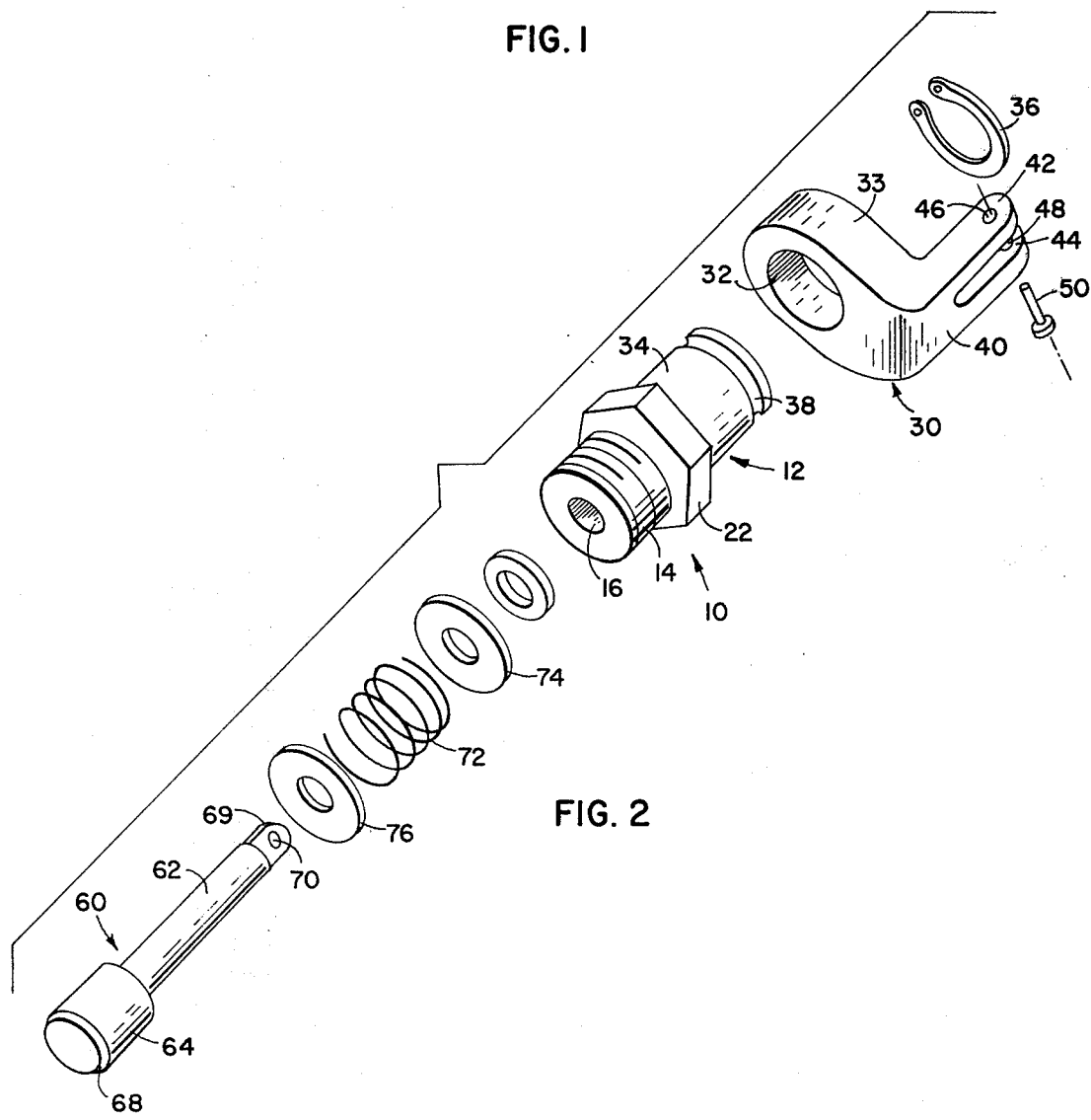
FIG. 2 is an exploded view illustrating the elements of the locking pin assembly of the invention.

Referring now to the drawings, the pin assembly 10 comprises a bushing 12 externally threaded on its end as indicated at 14 to screw into a hole 16 provided in the outer section 18 of a telescoping mast 20. The bushing 12 is provided with a hexagonal external shoulder 22 which abuts the outer surface of section 18 of the mast 20.

An L shaped bracket 30 has a hole 32 bored through one leg 33 and fits on the outer portion 34 of the bushing 12 and is retained by a snap ring 36 which fits in a groove 38. The outer leg 40 of bracket 30 is bifurcated to form two arms 42 and 44. Aligned bores 46 and 48 are formed in the arms 42 and 44 adjacent these outer ends and are adapted to receive a clevis pin 50.

A locking pin 60 having a stem portion 62 and an enlarged head portion 64 is slidably received in the bore 66 through the bushing 10. The end of the head portion 64 is chamfered as shown at 68. The end of the stem portion 62 is flatened as illustrated at 69 and provided with a transverse bore 70 for connection with a retracting mechanism. A spring 72 surrounds the stem portion 62 and is confined between two thrust washers 74 and 76 one of which bears against the bushing 12 and the other against the head portion 64.

Two short metal links, only one of which is shown at 80 in FIG. 1, are fastened one on either side of the flat end 69 of stem portion 62 by a clevis pin 82. A clevis pin 84 connects the other ends of the links to one corner of a triangular member 86. Another corner of the member 86 is pivotally mounted on the previously described clevis pin 50. A third hole 87 is provided in triangular member 86 adjacent the third corner thereof.

In operation of the device, the inner member 90 of the mast 20 is raised relative to the outer member 18 until the socket 92 is adjacent the head 64 of the pin 60. At this time the pin is retracted by moving the triangular member 86 to the right as viewed in FIG. 1 about the clevis pin 50. Since the bracket 30 and the pin 60 are freely rotatable relative to the bushing 12, this movement would in the actual structure be downward by means of a cable or other means attached to the hole 87 in the triangular member 86.

When the socket 92 is aligned with the pin 60 the triangular member 86 is released and the spring 72 moves the pin into the socket. The chamfer 68 on the head of the pin facilitates this operation.

Once the pin is inserted the mast sections are locked in extended position and the close tolerance between the head 64 and the side walls of the socket 92 provides very accurate registration in azimuth as required by the antenna carried by the mast.

I claim:

1. A locking mechanism for rigidly locking two telescoping members against relative movement comprising:
   a bushing threaded into a bore in one of said members,
   a pin having a stem portion slideably received within said bushing and a head portion adapted to project into a bore in the second of said members,
   spring means surrounding said stem portion of said pin and confined between said head portion and said bushing,
   a bracket rotatably mounted on the outer portion of said bushing,
   a triangular retracting plate pivotally mounted at one of its corners to said bracket and connected to another of its corners to the end of the stem portion of said pin, and
   means connected to the third corner of said plate for rotating the same about the corner pivoted to said bracket to retract said pin.

* * * * *